United States Patent [19]

Bukowsky

[11] 4,120,107
[45] Oct. 17, 1978

[54] TELEPHONE BRACKET FOR HOLDING ADVERTISING AND WRITING INSTRUMENT

[76] Inventor: Michael P. Bukowsky, 6942 Birdie La., St. Louis, Mo. 63129

[21] Appl. No.: 748,509

[22] Filed: Dec. 8, 1976

[51] Int. Cl.² ............................................. G09F 3/00
[52] U.S. Cl. .................................................... 40/336
[58] Field of Search ............... 40/336, 68.6; 281/15 B

[56] References Cited

U.S. PATENT DOCUMENTS

| | | | |
|---|---|---|---|
| 160,971 | 3/1875 | Torsch | 40/358 |
| 2,068,271 | 1/1937 | Huott | 40/336 |
| 2,624,965 | 1/1953 | Griswold | 40/336 |
| 3,188,113 | 6/1965 | Cross | 281/15 B |
| 3,260,006 | 7/1966 | Dunajew | 40/11 R |
| 3,469,336 | 9/1969 | Halperin | 40/336 |
| 3,909,968 | 10/1975 | Bolstad | 281/15 B |

Primary Examiner—Louis G. Mancene
Assistant Examiner—Wenceslao J. Contreras
Attorney, Agent, or Firm—Paul M. Denk

[57] ABSTRACT

In a bracket for use in conjunction with a telephone and designed for holding a series of advertising cards and a writing instrument, a base member of the bracket has integrally extending from it a curved portion that likewise connects with a retainer, with these various components useful for clamping onto the underside of the cradle of a telephone receiver; extending upwardly from the base member is a panel that has a pair of arms projecting further upwardly from each of its sides, and an aperture provided through the upper end of each arm is designed for supporting the aforesaid advertising cards, with a slot being located through each arm downwardly thereof, and designed for accommodating the support of a writing instrument, such as a pencil.

4 Claims, 7 Drawing Figures

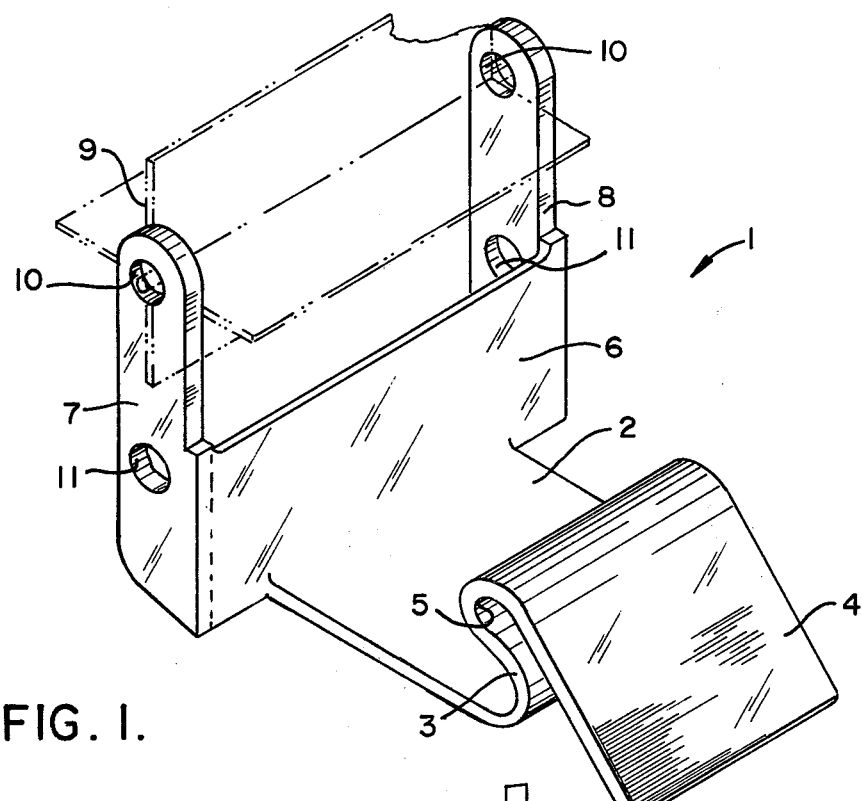
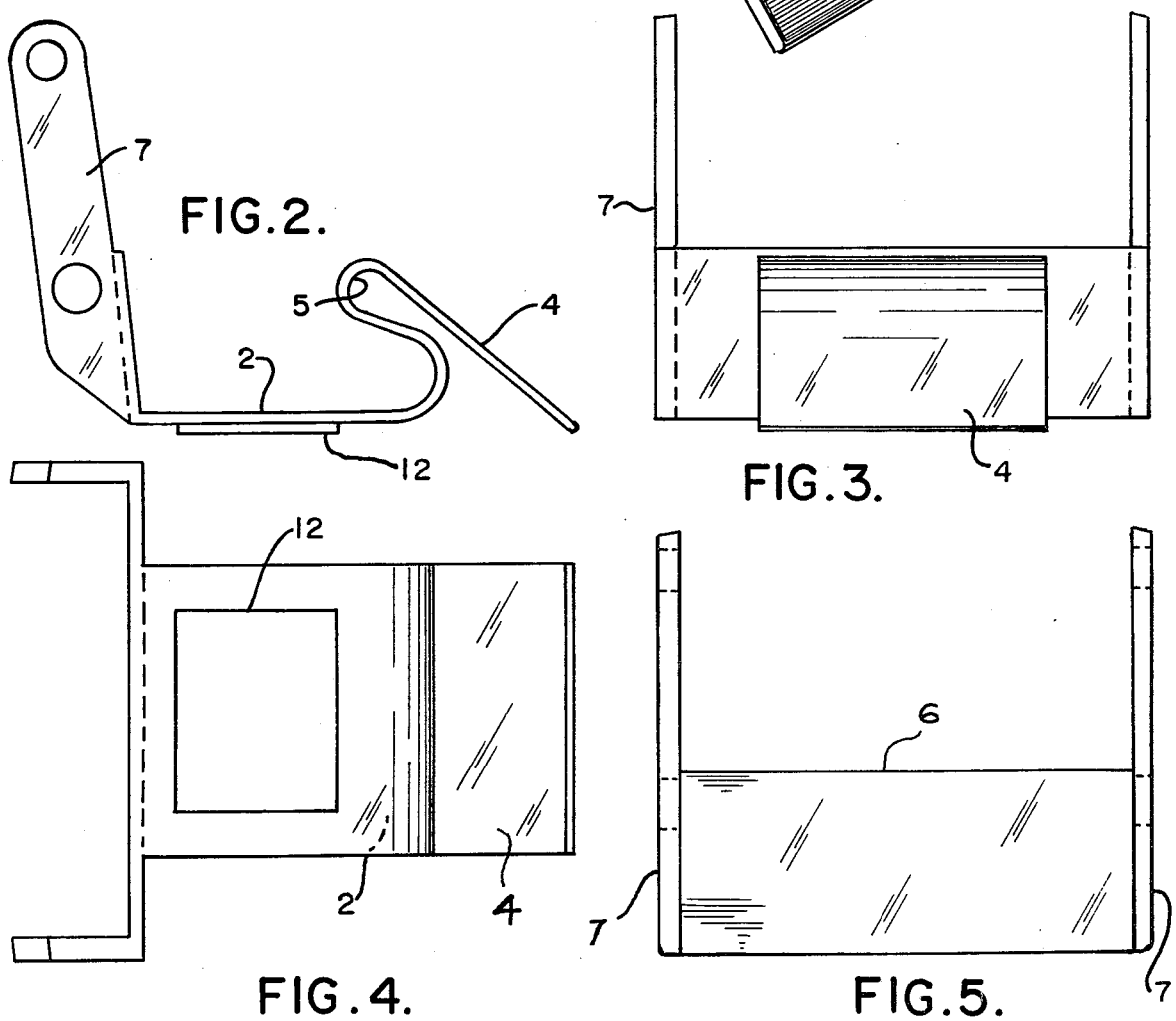

TELEPHONE BRACKET FOR HOLDING ADVERTISING AND WRITING INSTRUMENT

BACKGROUND OF THE INVENTION

This invention relates generally to a support, but more particularly pertains to a bracket useful for mounting to either the telephone, or a proximate wall, and functioning to support advertising cards and a writing instrument for the convenience of the telephone user.

Various types of directories have been formulated in the prior art, and which clamp in some manner to a telephone for the purpose of displaying either personal or emergency numbers at a location most convenient to the telephone user. For example, one such attachment, useful for supporting a calendar with respect to a telephone, is shown in the United States patent to Halperin, U.S. Pat. No. 3,469,336, while another type of calendar attachment that clamps into the cavity formed beneath the receiver cradle of a desk or table supported telephone is shown in the United States patent to Falk, U.S. Pat. No. 2,795,877. Likewise, a form of telephone index that is accompanied with an integral well for supporting index cards is also clamped into the cradle cavity of a telephone, and is shown in the United States patent to Shore, U.S. Pat. No. 2,488,516. Earlier types of telephone indexes or directories, and of the type that are clamp mounted to the older style of upright telephone, are shown in the United States patent to French, U.S. Pat. No. 974,957, and the United States patent to Rand, U.S. Pat. No. 1,466,059. All of these various types of attachments for telephones have their own particular utility for easing the use of the telephone, but some of these devices are rather complicated in structure and formed of many more components than are required in the formation of the current invention, but yet with the telephone bracket of the present invention being designed for conveniently displaying and disposing all of the usual indices, and other instruments normally sought for use by the telephone user, particularly during the instance of an emergency.

It is, therefore, the principal object of this invention to provide a convenient and compact single molded bracket that easily clamps onto the telephone, or onto the wall just proximate a wall mounted telephone, and therein dispose what emergency or other numbers may be required by the householder.

A further object of this invention is to provide a bracket for use in conjunction with the telephone and which conveniently supports within its same supporting structure any writing instrument as is frequently required by a telephone user.

Another object of this invention is to provide a compact bracket for use in conjunction with the telephone and which may be molded as a unified structure from the usual injection moldable polymers.

Another object of this invention is to provide a bracket that is easy to fabricate, small and reasonably compact in size, thereby facilitating the mass marketing of the same.

These and other objects will become more apparent to those skilled in the art upon reviewing the summary of this invention, and upon undertaking a study of its preferred embodiment in view of its drawing.

SUMMARY OF THE INVENTION

This invention comprises a bracket that finds utility when used in association with a telephone, either of the type that is provided for resting upon a desk or table, or the wall mounted type of phone. The bracket has utility in providing for the convenient and readily manipulated rotatably supported index cards that may display information, as for example in the category of advertisements, or various telephone numbers, such as particularly emergency numbers. In addition, the bracket is designed for supporting a pencil or other writing instrument at a very convenient location readily accessible to the telephone user, and thereby eliminating the age old chore of having to disrupt a telephone converation while the user seeks out a pencil for jotting down information relevant to the phone conversation.

The bracket includes, structurally, a base member that is formed having an integral arcuate portion extending forwardly thereof, and which portion generally undertakes the appearance of a figure S, or a serpentine configuration, as when viewed laterally, with the upper segment of the arcuate portion having a further extension in the form of a retainer that extends downwardly at an angle with respect to the previously defined base member. Thus, when these components are configured in this manner, and being formed of resilient plastic, they conveniently clamp onto that surface arranged intermediate the cradle for the telephone receiver and the cavity that is formed just therebelow that extends into the rear wall of the usual desk model telephone. As an alternative, and as previously analyzed, with respect to the use of this bracket in conjunction with the wall mounted phone, the base member may include a double faced adhesive tape that is pressure sensitive and which can be urged for adhering against the wall proximate the telephone for the purpose of supporting the bracket at a very contiguous and convenient location.

The opposite edge of the base member has integrally connected thereto a panel that extends upwardly at an angle with respect to the base, and which panel includes a pair of arms, one of each arm extending upwardly from the side edges of the said panel. Proximate the upper end of each arm there is located an aperture, with the aperture through each arm being aligned horizontally, and being designed for removably accommodating therein, in rotatable fashion, a series of information cards that may have imprinted thereon either the aforesaid type of advertising, or the telephone numbers as designated by the phone customer. Provided downwardly from the aforesaid arm apertures is a slot formed through each of the said arms, with these slots being aligned horizontally and being of a size to accommodate the insertion of a writing instrument, such as a pencil, therethrough, providing for its snug retention, as when not in use. These slots may be either formed as wholly closed apertures, or they may open towards the front or panel side of the bracket so as to facilitate a quicker removal or insertion of the pencil from the same.

BRIEF DESCRIPTION OF THE DRAWING

In the drawing,

FIG. 1 discloses an isometric view of the telephone bracket of this invention;

FIG. 2 provides a side elevational view of the bracket of this invention;

FIG. 3 furnishes a front elevational view of the bracket of this invention;

FIG. 4 furnishes a bottom plan view of the bracket of this invention;

FIG. 5 provides a back elevational view of the bracket of this invention.

DESCRIPTION OF THE PREFERRED EMBODIMENT

Figure 6:
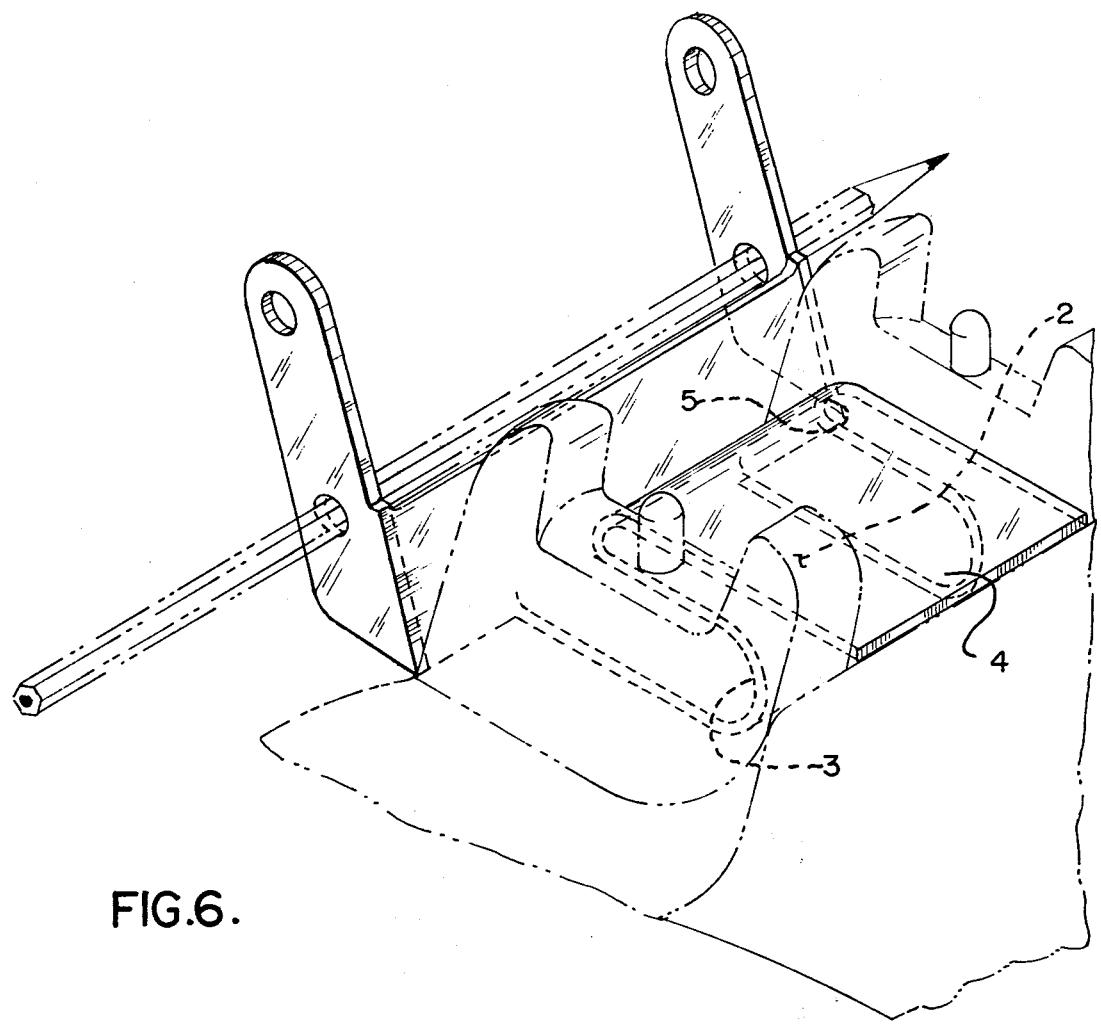
FIG. 6 shows the bracket installed onto a telephone.
Figure 7:
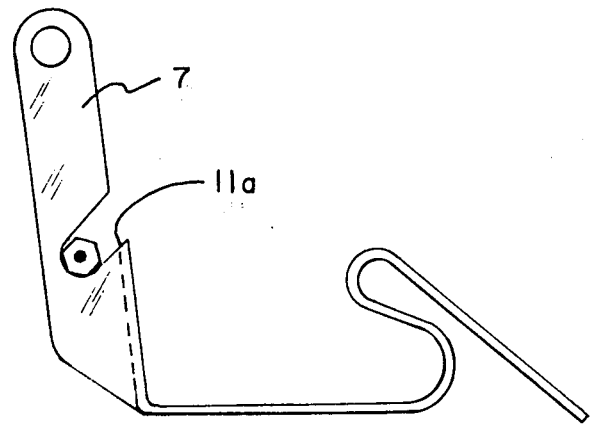
FIG. 7 shows the slot for holding a writing instrument.

In referring to the drawing, and in particular FIG. 1, there is disclosed the telephone bracket 1 of this invention, comprising a base member 2 that is integrally formed having a curved portion 3 at its frontal end, and which curved portion is rather serpentine in appearance, as when viewed from the side, having an extension projecting from its forward end to form a retainer 4. The spacing, as at 5, formed intermediate the curved portion 3 and the retainer 4 is designed for clamping onto the telephone, as previously analyzed, and particularly one of the desk or table top models.

Integrally formed extending upwardly from the back end of the base member 2 is a panel 6, and this panel is provided having some heighth so as to reinforce the bracket at this location. Connecting with each side of the panel 6 are the arms 7 and 8, said arms being spaced apart for a distance to provide for accommodating therebetween information cards, as disclosed in hidden line at 9, and of the type that may be used for displaying advertisements, or even telephone numbers, as previously summarized. An aperture, as at 10, is provided through the upper end of each of the arms 7 and 8, and these apertures are designed for accommodating the mounting extensions of the aforesaid cards 9. These cards, as supported in this fashion, are rotatable with respect to the bracket, and can be easily manipulated by the telephone user when he desires immediate information, particularly with respect to a number he desires to call. Provided downwardly through each of the arms 7 and 8 are the slots 11, with the slots in the preferred embodiment comprising apertures that are horizontally aligned and having sufficient dimensions so that a pencil or other writing instrument may be slid through the same for retention. And, the writing instrument may be easily slid laterally of the bracket to be freed when its use is required. As an alternative, the slots 11a may be opened to the front and slightly upwardly with respect to the arms and the panel 6 of the bracket, so that the writing instrument may be cradled within these opened slots to facilitate its support or removal as required.

As can be seen in FIGS. 2 and 4, connecting to the underside of the base member 2 is an adhesive connecting means 12, which may comprise a double faced pressure sensitive tape that can be conveniently secured to the underside of the base member, as shown, and then have its opposite and exposed adhesive surface readily adhered by means of the application of pressure on the bracket against the wall preferably within close proximity of the wall mounted style of telephone. This provides an alternate method for securement of this bracket either contiguously upon or adjacent to the various styles of the telephone.

This bracket preferably is formed of a unitary structure, and such is more easily acquired by the injection molding process for forming a polymer or plastic component. And, it may be desirable to provide a clear or transparent type of plastic bracket, or even one that is colored to match the color of the telephone housing, and as such an acrylic polymer may be used in the formation of the first type of enumerated bracket.

Variations or modifications to the bracket of this invention may occur to those skilled in the art upon reviewing the subject matter of this invention. Such variations, if within the spirit and scope of this invention, and encompassed by the claims appended hereto, are intended to be protected by any United States patent issuing upon this invention. The description of the preferred embodiment herein is set forth for illustrative purposes only.

Having thus described the invention what is claimed and desired to be secured by Letters Patent is:

1. A bracket for use in conjunction with a telephone and designed for rotatably supporting a collection of advertising cards in addition to holding a writing instrument comprising a base member, a panel connecting to said base member and extending angularly at an obtuse angle upwardly from said base member, a pair of arms, one of each arm connecting to said panel at a side thereof and projecting upwardly beyond said panel, each arm having an aperture provided through its proximate upper end and designed for accommodating the rotatable support of the advertising cards therein, a slot provided in each arm below the said upper arm apertures and at a distance providing clearance from any cards held by the said rotatable support, the slot in each arm comprising an aperture, and said apertures being aligned for holding a writing instrument therethrough, a retainer, an integrally curved portion connecting said base member and said retainer together, said base member, retainer, and their integrally curved portion provided for clamping onto the telephone to thereon display the rotatable advertising cards and dispose its held writing instrument for convenient usage, and a double faced adhesive tape attaching to the underside of the base member and capable of securing the backet to a supporting surface.

2. The invention of claim 1 and wherein the writing instrument supporting slot in each arm opens to the front of the bracket for facilitating the removal or arrangement of a writing instrument with respect to the bracket, and said arm slots being horizontally aligned and arranged below the level of any supported advertising cards.

3. The invention of claim 2 and wherein said bracket is formed from a polymer.

4. The invention of claim 3 wherein said polymer is an acrylic polymer.

* * * * *